United States Patent [19]
Ogura et al.

[11] Patent Number: 5,907,327
[45] Date of Patent: May 25, 1999

[54] APPARATUS AND METHOD REGARDING DRAG LOCKING WITH NOTIFICATION

[75] Inventors: Tsuyoshi Ogura; Akihisa Itoh, both of Fukushima-ken, Japan

[73] Assignee: Alps Electric Co., Ltd., Japan

[21] Appl. No.: 08/912,886

[22] Filed: Aug. 15, 1997

[30] Foreign Application Priority Data

Aug. 28, 1996 [JP] Japan .................................. 8-227151

[51] Int. Cl.⁶ ...................................................... G06F 3/00
[52] U.S. Cl. ........................................... 345/339; 345/173
[58] Field of Search ............................. 345/339, 173–178

[56] References Cited

U.S. PATENT DOCUMENTS 5,305,238  4/1994  Starr, III et al. ......................... 702/176
5,327,161  7/1994  Logan et al. .............................. 345/157
5,781,181  7/1998  Yanai et al. ............................... 345/173

FOREIGN PATENT DOCUMENTS 410003349  1/1998  Japan .
410069346  3/1998  Japan .

OTHER PUBLICATIONS

Burk, R., "A drag–and–drop edit control," Windows–Dos Developer's Journal, v3, n10, p39(9), 1992.
Gussin, L., "Horsesense and other tales: intermedia '93," CD–ROM World, v8, n7, p54(3), 1993.
Tessler, F., "GlidePoint," Macworld, v12, n7, p77(1), 1995.
Linzmayer, O. W., "Trackpads," MacWEEK, v9, n46, p62(1), 1995.
Tessler, F., "Touchpads," v13, n2, p68(1), Feb., 1996.
Perratore, Ed, "Versapad," Computer Shopper, v18, n2, p567(1), 1998.

Primary Examiner—A. Katbab
Attorney, Agent, or Firm—Brinks Hofer Gilson & Lione

[57] ABSTRACT

Disclosed are a coordinate input system and a method of controlling the coordinate input system, which can notify a user of a state of having come into a drag lock mode in an easily discernable manner, and hence can keep the user from being embarrassed as far as possible. When the user operates a coordinate detecting device (PD) such as a pad, the operating action is sent to a coordinate outputting device (PC) such as a personal computer. If the user makes a predetermined drag lock action, this action is detected by a measuring unit (13), causing a mode converter (14) to effect shift to a drag lock mode. The coordinate outputting device (PC) is thereby held in a similar state as allowing continuous dragging of an icon or window indicated on the screen of a display (16). At this time, a controller (15) replaces the cursor indicated on the screen by other one having a different shape specific to the drag lock mode. After that, if the user makes an action to release the drag lock mode, the mode converter (14) effects shift to a drag mode and the controller (15) restores the cursor on the screen to the original one having the shape before the shift to the drag lock mode.

6 Claims, 5 Drawing Sheets

APPARATUS AND METHOD REGARDING DRAG LOCKING WITH NOTIFICATION

BACKGROUND OF THE INVENTION

1. Field of the Invention

The present invention relates to a coordinate input system for use in operating a cursor or window on the screen, and a method of controlling the coordinate input system.

2. Description of the Related Art

Heretofore, mouses and track balls have been generally used as pointing devices connected to computers. However, other types of pointing devices called pads, touch pads, track pads, etc. have also been employed recently. In practical use, those pads are built in portable personal computers or externally connected to desk top computers, and do not require to be moved in themselves unlike mouses. Thus, those pads have a feature that they can be operated without problems even in a limited space on a desk or the like.

To move a cursor (or also called a pointer) on the display screen of a computer by using such a pad, it is only required for a user to put a finger on a flat operating surface several centimeters square provided on the pad and then slide the finger while keeping contact with the operating surface. Similarly to a mouse, a pad includes a left button and a right button. In addition, as with the case of clicking the left button, various operations such as selecting and moving an object displayed on the screen, for example, an icon (i.e., a symbol pattern representing the function of an application program) or a window (i.e., any of multiple independent screens indicated on a display), can also be performed by softly tapping the operating surface with a finger. An action of carrying out those operations in such a manner is especially called "tap (action)" or "tapping".

By utilizing the above tap function, a pad makes it possible with one finger to perform not only the above-stated operation equivalent to clicking of the left button, but also other operations equivalent to double clicking of the left button (used to, e.g., start up an application program), in which the left button is clicked twice successively, and dragging. Here, the operation called dragging means an action to move an object displayed on the screen, such as an icon or window, from one position to another desired position on the screen.

The dragging can be realized with a pad by first putting a cursor upon an object displayed on the screen, such as an icon or window, then tapping the operating surface once, placing a finger on the operating surface immediately after the tapping, and sliding the finger on the operating surface from there while keeping contact therebetween (slide action), causing the cursor to move on the screen. Alternatively, as with the case of using a mouse, the dragging can also be realized by keeping the left button depressed by one finger with the cursor put on an object such as an icon, and simultaneously sliding another finger on the operating surface. When the finger is lifted off from the operating surface during the slide action of the finger on the operating surface, a drag mode is released and the object is moved to the position on the screen to which the cursor has moved.

Meanwhile, some pads are designed such that if a finger is moved a predetermined distance on the operating surface after coming into a drag mode, the drag mode can be held continuously even after the finger is lifted off from the operating surface. This function is called "drag lock" because the drag action is held in a locked state in spite of the finger being lifted off from the operating surface. Once brought into a drag lock state, even if the finger is lifted off from the operating surface during the slide action, it is possible to freely move the icon or window, upon which the cursor has been first put, on the screen under continuation of the drag mode by sliding the finger on the operating surface again.

Usually, an effective area on the operating surface of a pad is smaller than that on the display screen of a computer. Thus, a region on the operating surface of a pad where the user can move a finger has a different size in many cases from a region on the display screen of a computer where a cursor is movable. Assume now that dragging is to be performed by moving a cursor along a diagonal line from the lower left corner to the upper right corner of the display screen of a computer under environment devoid of the drag lock function. In this case, even when the user slides a finger along a diagonal line on the operating surface of the pad from the lower left corner to the upper right corner, the cursor on the screen is moved just to a position midway the diagonal line of the screen.

Accordingly, to complete the dragging on the display screen of the computer, the drag action must be repeated several times on the operating surface of the pad and this is very troublesome for users. On the contrary, in pads having the drag lock function, once the drag action is performed on the operating surface of the pad, it is only required thereafter to simply slide a finger on the operating surface of the pad in a like manner as required when the cursor is usually moved. Thus, a burden imposed on users can be alleviated to a substantial extent.

As described above, providing the drag lock function makes it possible to considerably simplify the pad operation necessary for the dragging. But it can be said that the drag lock state is fairly anomalous, considering from the standpoint of usual pad operation. Accordingly, users may be embarrassed because they can not understand what has happened, in the case that (1) the users are not familiar with the pad operation, or (2) the drag lock state has been brought unintentionally by false operation of the pad even when the users are skilled in the pad operation.

SUMMARY OF THE INVENTION

In view of the state of art explained above, an object of the present invention is to provide a coordinate input system and a method of controlling the coordinate input system, which can notify users of a state of having come into a drag lock mode in an easily recognizable way, and hence can keep the users from being embarrassed as far as possible.

To achieve the above object, according to a first aspect of the present invention, a coordinate input system comprises an operating surface on which a coordinate indicator is operated, operating action detecting means for detecting an operating action performed by the coordinate indicator on the operating surface, screen operating means for carrying out screen operation corresponding to the operating action, drag lock detecting means for detecting, based on the operating action, a drag lock action that instructs locking of the screen operating means to a drag mode, and notifying means for notifying, in a predetermined manner, users of that the screen operating means is in a drag lock mode where the drag mode is in a locked state.

According to a second aspect of the present invention, in the coordinate input system of the first aspect, the notifying means executes the notice to users by changing the shape of a cursor indicated on the screen to a different shape specific to the drag lock mode.

According to a third aspect of the present invention, in the coordinate input system of the first or second aspect, the drag lock detecting means detects the drag lock action only when the coordinate indicator is dragged a predetermined distance on the operating surface in the drag mode.

According to a fourth aspect of the present invention, in a method of controlling a coordinate input system comprising at least an operating surface on which a coordinate indicator is operated, operating action detecting means for detecting an operating action performed by the coordinate indicator on the operating surface, screen operating means for carrying out screen operation corresponding to the operating action, and drag lock detecting means for detecting, based on the operating action, a drag lock action that instructs locking of the screen operating means to a drag mode, the screen operation being executed upon the operating surface being operated, the method comprises a first step of changing the shape of a cursor on the screen while the drag lock detecting means is detecting the drag lock action, and a second step of restoring the shape of the cursor to the original shape at the time when the drag lock action is no longer detected after shift to the first step.

DESCRIPTION OF THE PREFERRED EMBODIMENT

One embodiment of the present invention will be described hereunder with reference to the drawings. It is here noted that the present invention intends to configure a coordinate input system to be able to notify users of a drag lock state when this state has been established, and such a notice to users is called "drag lock feedback".

Figure 1:
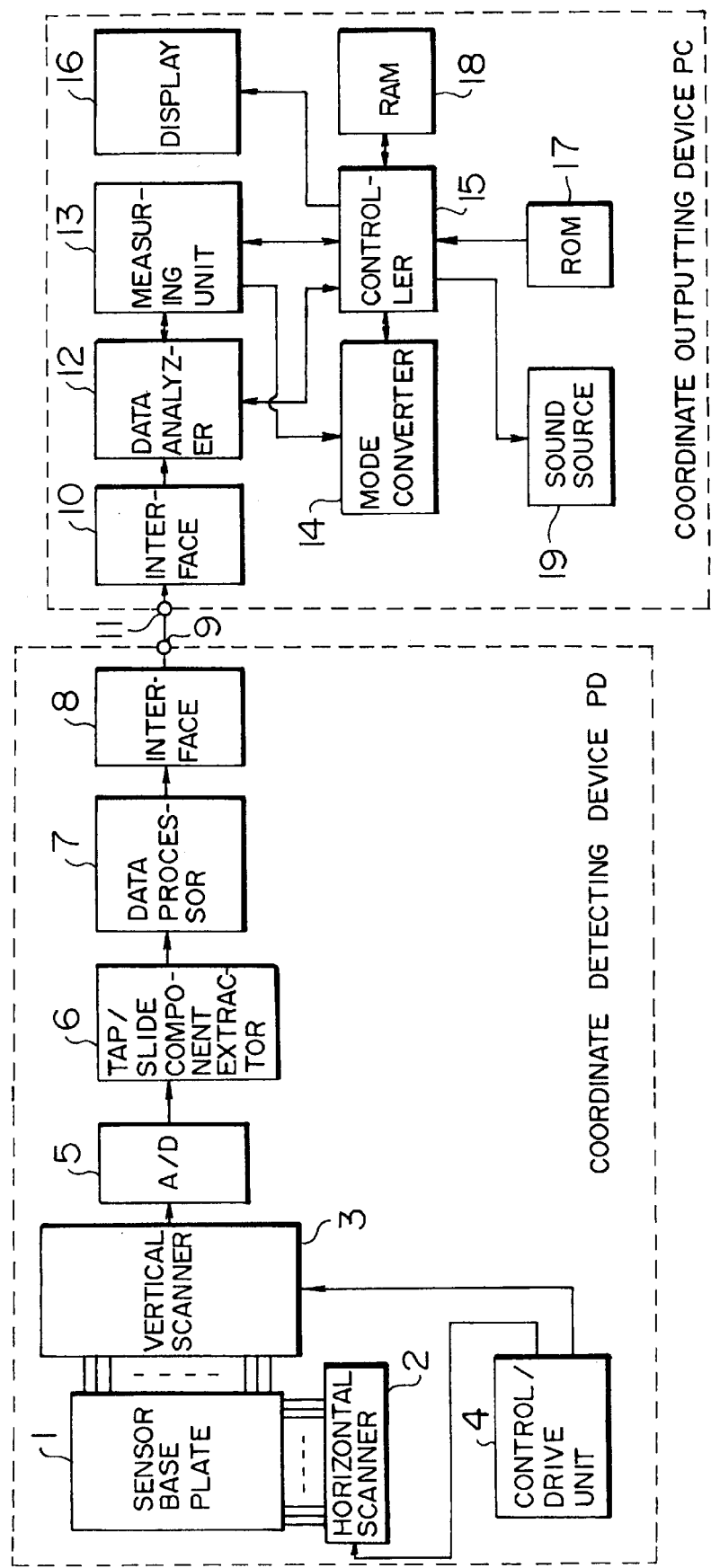
FIG. 1 is a block diagram showing a configuration of a coordinate input system according to one embodiment of the present invention.

Of the drawings, FIG. 1 is a block diagram showing a configuration of a coordinate input system according to this embodiment. As shown in FIG. 1, the coordinate input system mainly comprises two devices, i.e., a coordinate detecting device PD and a coordinate outputting device PC. The coordinate detecting device PD is, for example, a pad such as described above and the coordinate outputting device PC is, for example, a personal computer to which the pad is connected.

Figure 2:
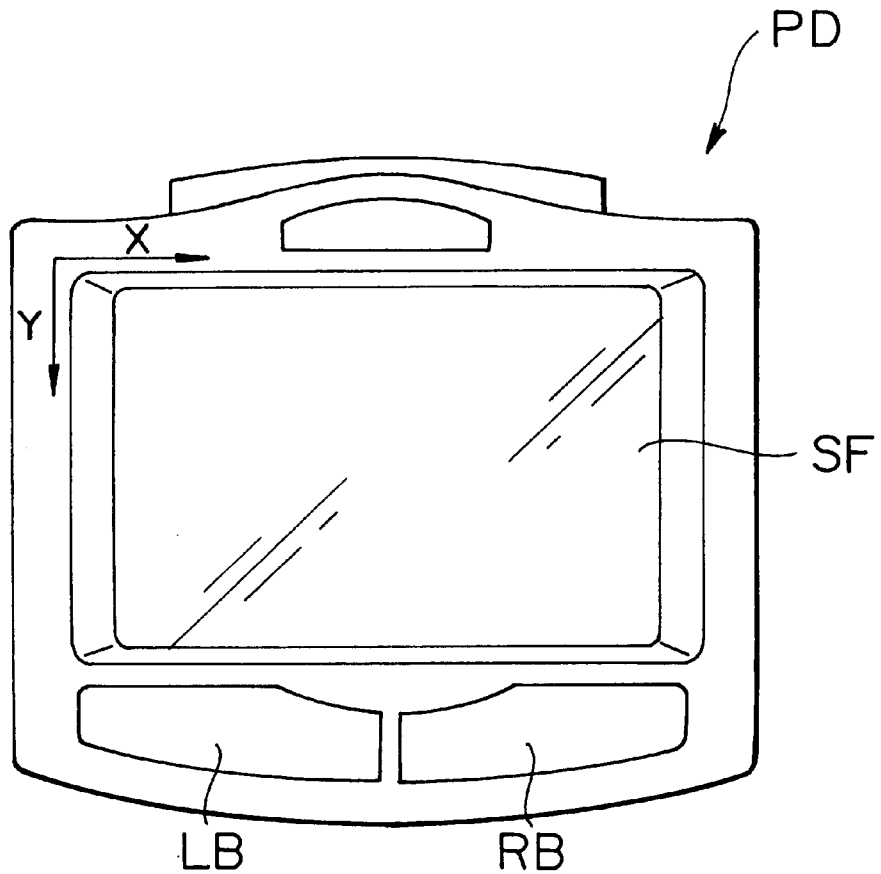
FIG. 2 is a top plan view showing an appearance of a coordinate detecting device PD according to the embodiment.

First, prior to describing various components of the coordinate detecting device PD, a mechanical configuration of the coordinate detecting device PD will be described in brief. FIG. 2 is a top plan view showing an appearance of the coordinate detecting device PD. A left button LB and a right button RB correspond to a left button and a right button of a mouse, respectively, and have the same functions as the corresponding buttons of the mouse. Also, a rectangular area denoted by reference characters SF represents an operating surface on which a coordinate indicator (not shown in FIG. 2) is operated. Note that the coordinate indicator used herein is a user's finger, for example, and the coordinate indicator means a finger F in the following description.

A sensor base plate 1 shown in FIG. 1 is provided under the operating surface SF and includes a plurality of horizontal scan lines (extending in the direction of an X-axis in FIG. 2) and a plurality of vertical scan lines (extending in the direction of a Y-axis in FIG. 2) formed thereon in a matrix pattern so that values of currents flowing through the scan lines are changed upon the finger F touching the operating surface SF. More specifically, the coordinate detecting device PD in this embodiment employs a tablet of electrostatic capacity type that electrodes in a matrix pattern are provided in each of front and rear sides of an electrostatic film and pulses are applied from one end of the electrostatic film to form an electric field. With this arrangement, when the finger is brought into contact with the electrostatic film through the operating surface SF, the electrostatic capacity in the contact portion is reduced. Therefore, the position of the contact portion where the finger touches the operating surface is detected by converting a change in the electrostatic capacity into changes in the current values. Thus, the coordinate position of the contact portion is designated by an intersect point between one horizontal scan line and one vertical scan line.

On the other hand, the above-explained tapping or tap action can be detected by detecting that the finger is lifted off from the operating surface SF immediately after touching it. Furthermore, sliding of the finger on the operating surface SF can also be detected by calculating a change in position of the finger contact portion.

Incidentally, the coordinate detecting device PD is not necessarily of electrostatic capacity type, but may be of pressure sensitive type, for example.

Then, a horizontal scanner 2 is a circuit which is used for horizontal scan of the sensor base plate 1 and has a multiplicity of signal output terminals connected to the horizontal scan lines of the sensor base plate 1.

A vertical scanner 3 is a circuit which is used for vertical scan of the sensor base plate 1, has a multiplicity of signal input terminals connected to the vertical scan lines of the sensor base plate 1, and generates a serial detection signal representing a scan action of the finger.

The serial detection signal includes a tap component produced when the finger is tapped on the operating surface SF of the sensor base plate 1, and a slide component produced when the finger is slid on the operating surface SF. Here, the tap component includes an address component indicating the position where the finger contacts the operating surface SF, and the slide component includes address components indicating from which position the finger has slid to which position on the operating surface SF.

A control/drive unit 4 supplies respective scan driving signals to the horizontal scanner 2 and the vertical scanner 3 for driving the horizontal scanner 2 and the vertical scanner 3.

An A/D (analog/digital) converter 5 converts the serial detection signal produced by the vertical scanner 3 into a digital signal.

A tap/slide component extractor 6 extracts the tap and slide components from the serial detection signal converted into the digital signal, and carries out conversion into three-dimensional coordinate values after separating the tap and slide components from each other. The three-dimensional coordinate values are then output along with the tap and slide components.

Based on the three-dimensional coordinate values sent from the tap/slide component extractor 6, a data processor 7 determines whether the tap action has been executed or not. At the same time, the data processor 7 removes noise from the slide component and transforms through correction a change in position of the finger on a two-dimensional coordinate system of the operating surface SF, which is made up of X-/Y-axes, into a smooth straight or curved line.

An interface 8 is a circuit for transferring data between the coordinate detecting device PD and the coordinate outputting device PC. Based on the information sent from the data processor 7, the interface 8 adds information about tap-on/off and information about turning-on/off of each of the left button LB and the right button RB for each of the corrected absolute coordinate positions (X, Y) on the two-dimensional coordinate system of the operating surface SF. These items of information are then delivered to an output port 9 along with the tap and slide components.

Various components of the coordinate outputting device PC will now be described.

First, an interface 10 is a circuit for transferring data between the coordinate outputting device PC and the coordinate detecting device PD, and receives the above-stated items of information through an input port 11. Note that if the coordinate outputting device PC is a personal computer, the interface 10 and the input port 11 correspond to a known serial port or mouse port.

A data analyzer 12 takes in through the interface 10 the items of information sent from the side of the coordinate detecting device PD, and detects not only click actions of the left and right buttons, but also a tap action, a drag action, a slide action, etc. on the operating surface SF made by the user from the button-on/off information, the tap-on/off information, and so forth. Then, the data analyzer 12 supplies a detected result to a measuring unit 13 and a controller 15 (described later) along with the tap and slide components.

At the time when detection of the drag action is informed from the data analyzer 12, the measuring unit 13 supplies a control signal indicating the detection of the drag action to a mode converter 14 (described later). Also, after the time at which the drag action has been detected, the measuring unit 13 monitors whether the slide action is made or not. If the distance by which the finger F is slid on the operating surface SF exceeds a certain predetermined value, this is determined as a drag lock action. The measuring unit 13 then supplies a control signal indicating the detection of the drag lock action to the mode converter 14.

The drag lock action may be detected by any other method than above. For example, a period of time in which the slide action continues after the detection of the drag action is measured. Then, if the measured value exceeds a certain value, this may be determined as a drag lock action. An alternative method may not include sliding of the finger F on the operating surface SF after the drag action. For example, if the finger F is touched on the operating surface SF again after the tapping and a predetermined period of time elapses with the finger F kept contact with the operating surface SF, this may be determined as a drag lock action.

On the other hand, the measuring unit 13 has the so-called "auto-release" function of automatically releasing the drag lock state if a certain predetermined period of time has just elapsed, without waiting for any action from the user. To this end, the measuring unit 13 includes a timer mechanism for measuring a period of time elapsed from the detection of the drag lock action, and monitors whether the period of time measured by the timer exceeds a certain preset value. At the time when the preset value is exceeded, the measuring unit 13 delivers a control signal indicating the detection of the auto-release to the mode converter 14.

In addition to the above, the measuring unit 13 further supplies corresponding control signals to the mode converter 14 when the tap action is executed after the detection of the drag lock action (this represents a condition of releasing the drag lock state) and when the tap-off information is detected after the detection of the drag action (.this represents a condition of releasing the drag state).

In accordance with the control signal sent from the measuring unit 13, the mode converter 14 switches over the coordinate outputting device PC to one of a drag mode, a drag lock mode and a normal mode other than the former twos. More specifically, when the detection of the drag action is informed from the measuring unit 13, the mode converter 14 shifts the coordinate outputting device PC from the normal mode to the drag mode, and when the detection of the drag lock action is informed from the measuring unit 13, it shifts the coordinate outputting device PC from the drag mode to the drag lock mode.

Further, when the detection of the tap action or the elapse of the auto-release time is informed from the measuring unit 13 during the drag lock mode, the mode converter 14 restores the coordinate outputting device PC to the drag mode. Additionally, as with conventional systems, when the detection of the tap-off information is informed from the measuring unit 13 during the drag mode, the mode converter 14 restores the coordinate outputting device PC to the normal mode. Whenever any of those mode changes is performed, the mode converter 14 informs the controller 15 of the mode after the change.

Moreover, the mode converter 14 stores therein a setting value indicating whether to permit or prohibit the drag lock feedback, and the types of the cursor to be indicated on the screen when the drag lock feedback is under execution. Incidentally, these items of information are stored in the mode converter 14 by the controller 15 in accordance with, e.g., the known processing sequence which is proceeded by the user responding to the menu indicated on the display screen of a computer.

The controller 15 is a circuit for supervising the components of the coordinate outputting device PC except the interface 10. Functions of the controller 15 will be described in detail in the following explanation of the operation.

The display 16 comprises a display device of a personal computer, for example, and indicates various images, including a window and cursor, on the screen of the display device in accordance with instructions from the controller 15.

Figure 3A:
FIG. 3A is an illustration showing one example of a cursor indicated on a display screen in a normal condition and FIG. 3B is an illustration showing one example of a cursor indicated on the display screen in a condition of drag lock feedback.
Figure 3B:

A ROM (Read Only Memory) 17 stores therein operating programs for the controller 15, data of various cursor shapes, sound information for use in producing sounds from a sound source 19 (described later), etc. The various cursor shapes include a typical shape of arrow as shown in FIG. 3A. On the other hand, the cursor displayed under the drag lock feedback may have any desired shape unless it is not used in other modes than the drag lock feedback. But the cursor preferably has such a shape as enabling the user to understand at a glance that the drag mode is in the "locked" state. Preferable conceivable shapes of the cursor are, e.g., "fist" (see FIG. 3B), "lock" and "key".

A RAM (Random Access Memory) 18 is a memory circuit for temporarily storing data when the controller 15 executes various processing steps. As one example, the RAM 18 stores a "flag" indicating whether the drag lock feedback is under execution or not. If the flag is turned on, this indicates that the drag lock feedback is under execution, and if the flag is turned off, this indicates that the drag lock feedback is not under execution. Incidentally, the flag is set to turn off in its initial state.

The above data of the cursor shapes may be stored in the RAM 18 rather than in the ROM 17. By thus storing, the controller 15 can transfer the data of the cursor shapes to the RAM 18 from an external memory medium, such as a hard disk, beforehand so that the user can employ the cursor having a shape prepared by himself, for example.

A sound source 19 comprises a speaker and a drive circuit for the speaker, for example, and produces various kinds of sounds in accordance with sound information sent from the controller 15.

The operation of the coordinate input system having the above-stated configuration will be described below.

At the beginning, the user makes setting beforehand whether to permit or prohibit the drag lock feedback, thereby storing a setting value in the mode converter 14. Also, the user designates the type of the cursor to be indicated on the screen of the display 16 when the drag lock feedback is under execution, thereby storing the designated cursor type in the mode converter 14. Further, the user sets in the measuring unit 13 a period of time that should be elapsed from the drag lock action until the auto-release of the drag lock state. A series of these setting procedures are carried out by the user by, for example, displaying a setting window on the screen. Such setting procedures are well known in the art and hence will not be described in detail.

The detailed operation of the coordinate input system will now be described with reference to a flowchart of FIG. 4. It is assumed in the following description that, in the initial state, the drag lock feedback is not executed and the flag stored in the RAM 18 is turned off. It is also assumed that the controller 15 is indicating the cursor having a shape shown in FIG. 3A on the screen of the display 16. Although the user can designate in practice whether to permit or prohibit the drag lock feedback, it is further assumed for simplicity of the explanation that the drag lock mode is always feasible if only requirements for shift to the drag lock mode is satisfied.

Figure 4:
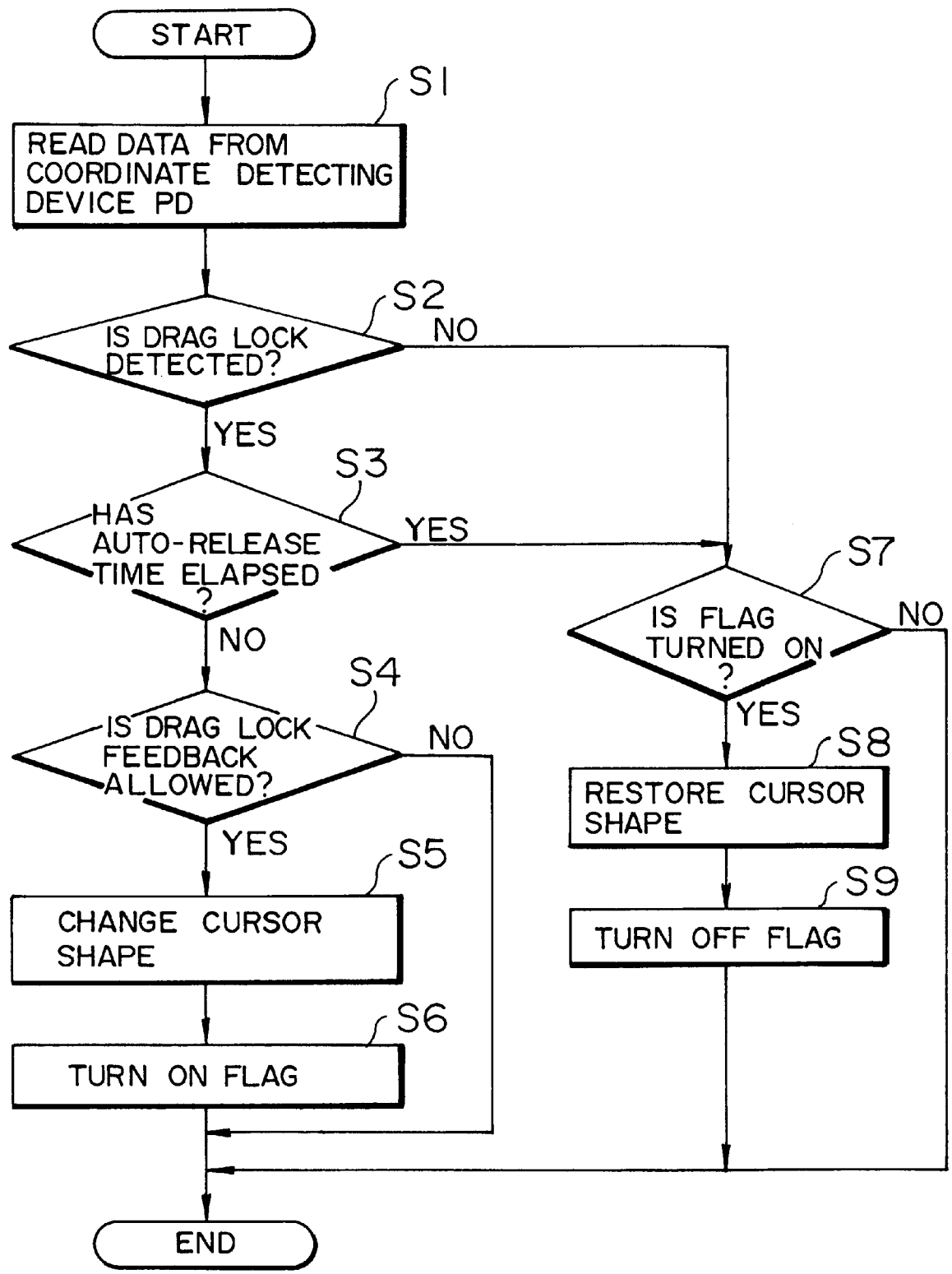
FIG. 4 is a flowchart for explaining operation of the coordinate input system according to the embodiment.

First, in step S1 of FIG. 4, data is taken into the coordinate outputting device PC from the coordinate detecting device PD. This data taking-in process will now be described with reference to FIG. 1. In the coordinate detecting device PD, the horizontal scanner 2 and the vertical scanner 3 are driven for scan by driving signals output from the control/drive unit 4. When the user touches the sensor base plate 1 (i.e., the operating surface SF) in a desired position with the finger F (see FIG. 5) while scan signals are supplied to the respective scan lines on the sensor base plate 1, a serial detection signal corresponding to the operating action of the finger F is output from the vertical scanner 3.

The serial detection signal is converted into a digital signal by the A/D converter 5, and thereafter the tap/slide component extractor 6 extracts tap and slide components from the digital signal. The data processor 7 delivers the tap component directly to the interface 8, and removes noise from the slide component for correction before delivering the slide component to the interface 8. The interface 8 produces tap-on/off information and button-on/off information, adds these items of information to the data sent from the data processor 7, and then supplies them to the output port 9 for delivery to the coordinate outputting device PC.

On the side of the coordinate outputting device PC, the information supplied to the input port 11 is sent to the data analyzer 12 through the interface 10. The process of taking in data from the coordinate detecting device PD into the coordinate outputting device PC is thus completed. Here, if the taken-in data is given by data representing only the slide action of the finger F, the information supplied from the coordinate detecting device PD is sent to the controller 15 which converts the information into data suitable for displaying an image and supplies the converted data to the display 16. As a result, corresponding to the movement of the finger F on the operating surface SF, the cursor is moved on the screen of the display 16 relative to an object, such as a window or icon, indicated on the display screen.

Figure 5:
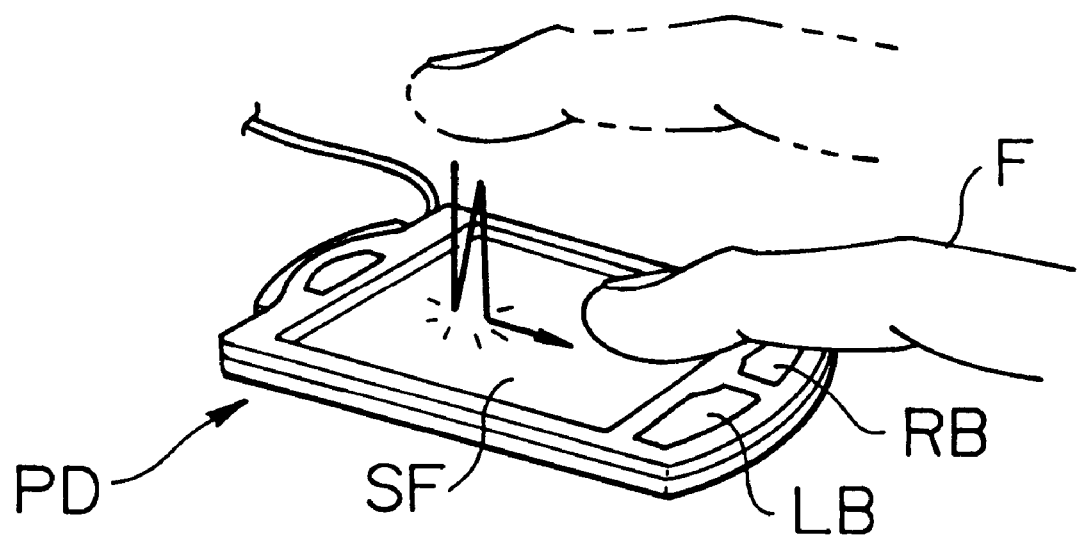
FIG. 5 is an illustration for explaining an operation sequence executed when a user performs a drag action by using the coordinate input system.

Next, the operation proceeds to step S2 in FIG. 4 to determine whether the drag lock action is detected or not, by checking if the user makes actions with the finger F as shown in FIG. 5. This determining process will be described below in detail. If the user performs a series of predetermined actions with the finger F, i.e., if the user makes finger F touch the operating surface SF and then lift off immediately (i.e., tap action) and, after a short period of time, makes the finger F touch the operating surface SF again and continuously slide from there as shown in FIG. 5, the coordinate outputting device PC is brought into the drag mode.

To this end, the data analyzer 12 first detects based on the tap-on/off information whether a series of actions of tap-on→tap-off→tap-on have been made within a predetermined short period of time. Then, based on the slide component, the data analyzer 12 detects whether the slide action of the finger F follows such a series of actions. When the above tap action and the slide action, i.e., the drag action, is detected, the data analyzer 12 delivers to the measuring unit 13 a detection signal indicating that the drag action has been detected.

In response to the detection signal for the drag action from the data analyzer 12, the measuring unit 13 delivers to the mode converter 14 a control signal indicating the detection of the drag action. After that, the mode converter 14 monitors based on the slide component whether the finger F continues sliding on the operating surface SF. Simultaneously, the mode converter 14 shifts the coordinate outputting device PC to the drag mode. Thereafter, at the time when the measuring unit 13 detects that the user continues sliding the finger F on the operating surface SF and also confirms that the distance by which the finger F has slid exceeds a certain predetermined value, the measuring unit 13 delivers to the mode converter 14 a control signal indicating the above fact. In response to this control signal, the mode converter 14 shifts the coordinate outputting device PC to the drag lock mode.

If the drag lock action is detected in step S2 as described above, then the operation proceeds to step S3 where the measuring unit 13 determines whether a predetermined period of time set for the auto-release of the drag lock state has elapsed or not from the detection of the drag lock action. Here, the set auto-release time is not yet elapsed. Therefore, the measuring unit 13 informs the result of the determination to the controller 15. The operation then proceeds to step S4 where the controller 15 refers to the setting information of the drag lock feedback stored in the mode converter 14 and determines whether the user has made the setting to permit the execution of the drag lock feedback or not.

Now, if the execution of the drag lock feedback is permitted by the user, then the operation proceeds to step S5 where the controller 15 retracts into the RAM 18 the normal type cursor (i.e., the arrow-shaped cursor shown in FIG. 3A) which is indicated on the display 16 at that time. After that, the controller 15 takes in from the mode converter 14 the type of the cursor that is to be displayed when the drag lock feedback is under the execution (this type cursor is hereinafter assumed to have the form of a fist shown in FIG. 3B), and reads shape data corresponding to that type of the cursor from the ROM 17, thereby indicating that type cursor on the screen of the display 16. Subsequently, in step S6, the controller 15 rewrites the flag stored in the RAM 18 from an off-state to an on-state to indicate that the drag lock feedback is under the execution.

If the finger F is lifted off from the operating surface SF after that, the tap-off information is informed from the coordinate detecting device PD to the coordinate outputting device PC. At this time, however, the coordinate outputting device PC has been already brought into the drag lock mode. Accordingly, unlike the case where the finger F is lifted off in the simple drag mode, the drag state is kept continued in the coordinate outputting device PC.

Figure 6:
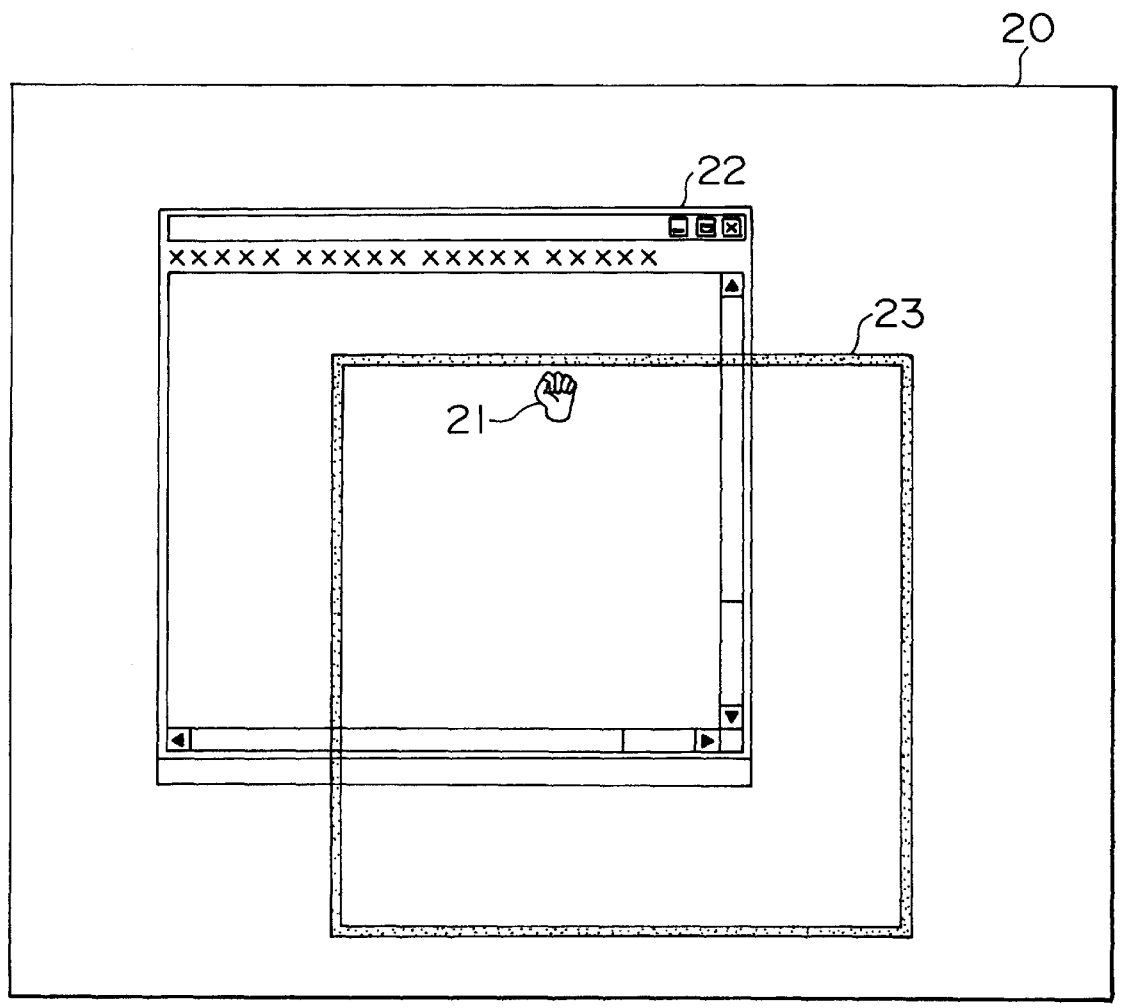
FIG. 6 is a view showing one example of a screen representation indicated on a display when the coordinate input system has come into the drag lock mode.

Supposing now that an object to be dragged is a window, for example, not only a cursor 21 in the form of a fist and a window 22 to be dragged, but also a frame 23 having the same size as the window 22 remain displayed on a screen 20 of the display 16 (see FIG. 1) as shown in FIG. 6. When the finger F is put on the operating surface SF again in the above condition and continuously slid from there, the controller 15 moves the cursor 21 and the frame 23 in interlock relation on the screen 20 corresponding to the slide action of the finger F in accordance with the slide component sent from the data analyzer 12.

Even after that, during a period of time in which the drag lock condition is detected, the above processing from step S1 to step S6 is repeated.

Subsequently, when the user makes the tap action on the operating surface SF, the processing of step S2 determines that the drag lock condition is no longer detected. More specifically, if the measuring unit 13 detects the tap action again after the time at which the drag lock action has been detected, it delivers to the mode converter 14 a control signal indicating the above fact, thereby informing release of the drag lock mode. In response to the control signal, the mode converter 14 informs it to the controller 15.

Next, the operation proceeds to step S7 where the controller 15 refers to the flag stored in the RAM 18 and confirms that the flag is turned on (i.e., the drag lock feedback is under execution). Then, in step S8, the controller 15 reads the type of the cursor retracted into the RAM 18 and takes in shape data corresponding to that type of the cursor from the ROM 17, thereby restoring the cursor indicated on the screen 20 of the display 16 from the form of a fist (see FIG. 3B) to the form of an arrow (see FIG. 3A).

On the other hand, when the mode converter 14 is informed of the release of the drag lock mode from the measuring unit 13 and thereafter the controller 15 confirms in step S7 the flag being turned on, the mode converter 14 shifts the coordinate outputting device PC from the drag lock mode to the drag mode.

Then, in step S9, the controller 15 rewrites the flag stored in the RAM 18 from an on-state to an off-state to set a state that the drag lock feedback is not executed. After that, the operation is performed appropriately in a like manner to the case in the conventional drag mode as mentioned above.

If the measuring unit 13 detects the auto-release of the drag lock state in step S3 while the processing of steps S1–S6 is repeated after shift to the drag lock mode, then the mode converter 14 receives from the measuring unit 13 a control signal indicating the auto-release of the drag lock state, and shifts the coordinate outputting device PC from the drag lock mode to the drag mode. Therefore, the operation proceeds to step S7 to execute the processing of steps S7–S9 in accordance with the above-explained procedures and then execute the processing in a similar manner as in the conventional drag mode.

Incidentally, if the drag lock feedback is prohibited in step S4, then the processing for the drag lock mode is carried out in accordance with similar procedures as conventional without executing the above processing of steps 5 and 6, i.e., without changing the shape of the cursor.

With this embodiment, as described above, if the drag lock feedback is just allowed when the mode is shifted to the drag lock mode, the cursor is replaced by other one having a different shape specific to the drag lock mode. This provides an advantage of keeping users from being hardly embarrassed even in the case that the users are not familiar with the pad operation, or that the drag lock state has been brought unintentionally by false operation of the pad.

While the state of having come into the drag lock mode is notified to the user in the above embodiment by changing the shape of the cursor, the manner of realizing the drag lock feedback is not limited to the above embodiment. For example, the drag lock feedback may be realized by causing the sound source 19 to issue an alarm sound specific to the drag lock mode, or changing a pattern of the frame 23 on the screen 20, at the time when the drag lock mode is established. In addition, other various notifying methods are also conceivable by those skilled in the art.

According to the present invention, as described above, when the drag lock action is performed on the operating surface, the fact that the drag mode is instructed to be locked by such an action on the screen is notified to the user in a predetermined manner. It is thus possible to provide an advantage of keeping users from being embarrassed even in the case that the screen operation is performed by unskilled users, or that the drag lock state has been brought unintentionally by false operation of the pad.

According to one preferable form of the present invention, since the drag lock state is notified to the user by changing the shape of the cursor displayed on the screen, it is possible to provide an advantage of enabling the user to recognize by taking a glance at the screen that the drag lock state is established.

What is claimed is:

1. A coordinate input system for drag control comprising:

an operating surface on which a coordinate indicator is operated, operating action detecting means for detecting a tap operating action or a slide operating action performed by said coordinate indicator on said operating surface, screen operating means for carrying out screen operation corresponding to said operating action, drag mode converting means for transferring a state of said screen operating means to a drag mode state on the basis of said tap operating action, drag lock mode converting means for transferring a state of said screen operating means to a drag lock mode state in response to said slide operating action under said drag mode state, and notifying means for detecting the conversion into said drag lock mode state and notifying, in a predetermined manner, that said drag mode state is continued.

2. The coordinate input system of claim 1, wherein said notifying means executes said notice to users by changing the shape of a cursor indicated on said screen to a different shape specific to the drag lock mode.

3. The coordinate input system of claim 1, wherein said drag lock detecting means detects said drag lock action only when said coordinate indicator is dragged a predetermined distance on said operating surface in the drag mode.

4. The coordinate input system of claim 2, wherein said drag lock detecting means detects said drag lock action only when said coordinate indicator is dragged a predetermined distance on said operating surface in the drag mode.

5. A method of controlling a coordinate input system for drag control comprising:

an operating surface on which a coordinate indicator is operated, operating action detecting means for detecting a tap operating action or a slide operating action performed by said coordinate indicator on said operating surface, screen operating means for carrying out screen operation corresponding to said operating action, drag mode converting means for transferring a state of said screen operating means to a drag mode state on the basis of said tap operating action, drag lock mode converting means for transferring a state of said screen operating means to a drag lock mode state in response to said slide operating action under said drag mode state, drag lock detecting means for detecting conversion into said drag lock mode, and drag lock releasing mode conversion means in which a drag lock mode state is released in response to said tap operating action under said drag lock mode state and recovered to said drag mode state, said method comprising:

a first step of changing the shape of a cursor on said screen while said drag lock detecting means is detecting said drag lock action, and a second step of restoring the shape of said cursor at the time when said drag lock mode state is released after shift to said first step.

6. The method of claim 4, wherein said drag lock releasing mode conversion means includes an automatic releasing function for automatically releasing after elapsing of a predetermined period of time from a time at which the drag lock mode state is detected.

\* \* \* \* \*

UNITED STATES PATENT AND TRADEMARK OFFICE
CERTIFICATE OF CORRECTION

PATENT NO. : 5,907,327
DATED : May 25, 1999
INVENTOR(S) : Ogura et al.

It is certified that error appears in the above-identified patent and that said Letters Patent is hereby corrected as shown below:

On the Title Page, item [57], Abstract,

In column 2, line 15, replace "other" with --another--.

In claim 6, line 1, replace "4" with --5--.

Signed and Sealed this

Fourteenth Day of December, 1999

Attest:

Q. TODD DICKINSON

Attesting Officer

Acting Commissioner of Patents and Trademarks